United States Patent [19]
Taylor et al.

[11] 3,721,811
[45] March 20, 1973

[54] APPARATUS FOR COMMANDING A DECELERATION IN NUMERICAL CONTROL SYSTEMS

[75] Inventors: Ian K. Taylor; Maurice R. Jones, both of Biggleswade, England

[73] Assignee: Cincinnati Milacron Inc., Cincinnati, Ohio

[22] Filed: April 29, 1971

[21] Appl. No.: 138,597

[52] U.S. Cl. ............. 235/151.11, 318/270, 318/369, 318/570
[51] Int. Cl. .................................................. G06f 15/46
[58] Field of Search......... 235/150.2, 151.11, 151.32; 318/570, 265, 270, 286, 364, 369

[56] References Cited

UNITED STATES PATENTS

| | | | |
|---|---|---|---|
| 3,519,805 | 7/1970 | Thorne-Booth | 235/150.2 |
| 3,617,715 | 11/1971 | Dummermuth | 235/151.11 |
| 3,629,560 | 12/1971 | Slawson | 235/151.11 |
| 3,344,260 | 9/1967 | Lukens | 235/151.11 |
| 3,204,132 | 8/1965 | Benaglio et al. | 235/151.11 UX |
| 3,110,865 | 11/1963 | Scuitto | 235/151.11 UX |

*Primary Examiner*—Malcolm A. Morrison
*Assistant Examiner*—Jerry Smith
*Attorney*—Howard T. Keiser and Alfred J. Mangels

[57] ABSTRACT

An apparatus for commanding deceleration of a driving mechanism at a point along a path permitting the driving mechanism to position a load at a predetermined end point in the minimum time. The driving mechanism is responsive to a plurality of pulses having a frequency defining velocity along the path. A circuit is provided having an input responsive to the plurality of pulses and producing an output signal as a function of the square of the input, i.e., path velocity. This signal is compared with a position signal representing the untraversed distance along the path. When the difference between these two signals reaches a predetermined value, e.g., zero, a detection circuit produces a deceleration signal commanding a predetermined rate of decrease in he frequency of the plurality of pulses. Thus the driving mechanism decelerates and brings the load to the predetermined end point in the minimum time.

4 Claims, 7 Drawing Figures

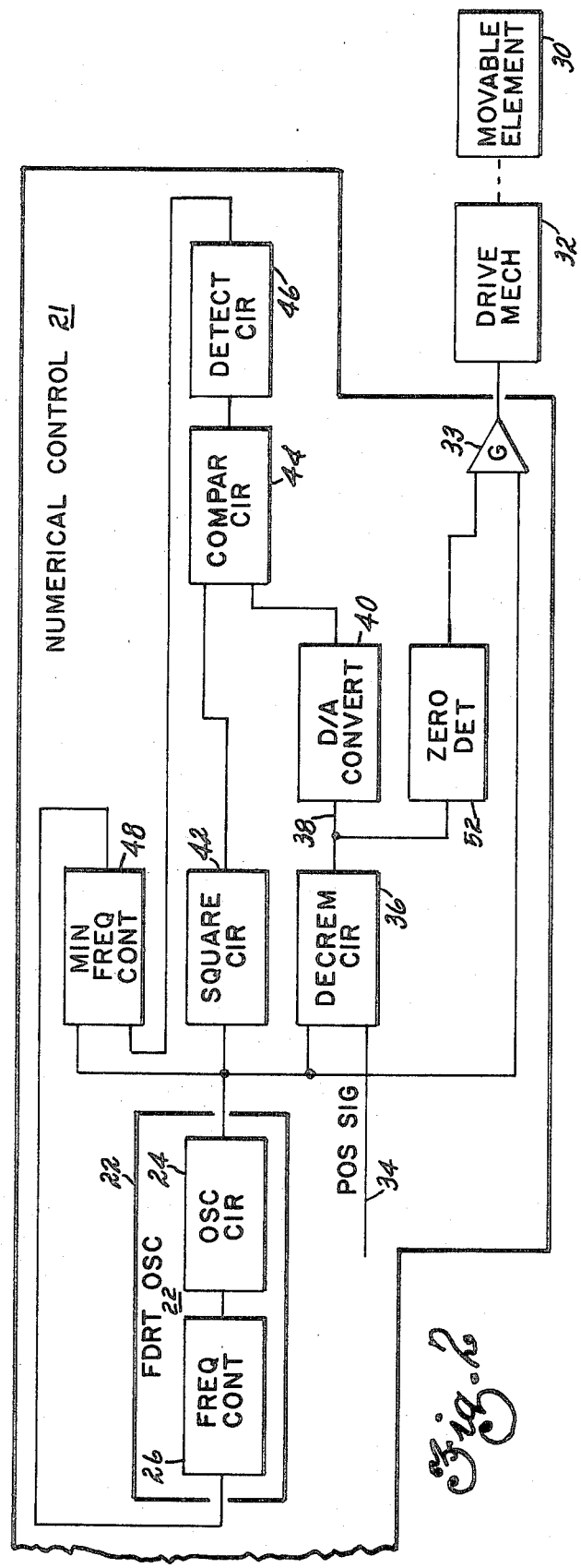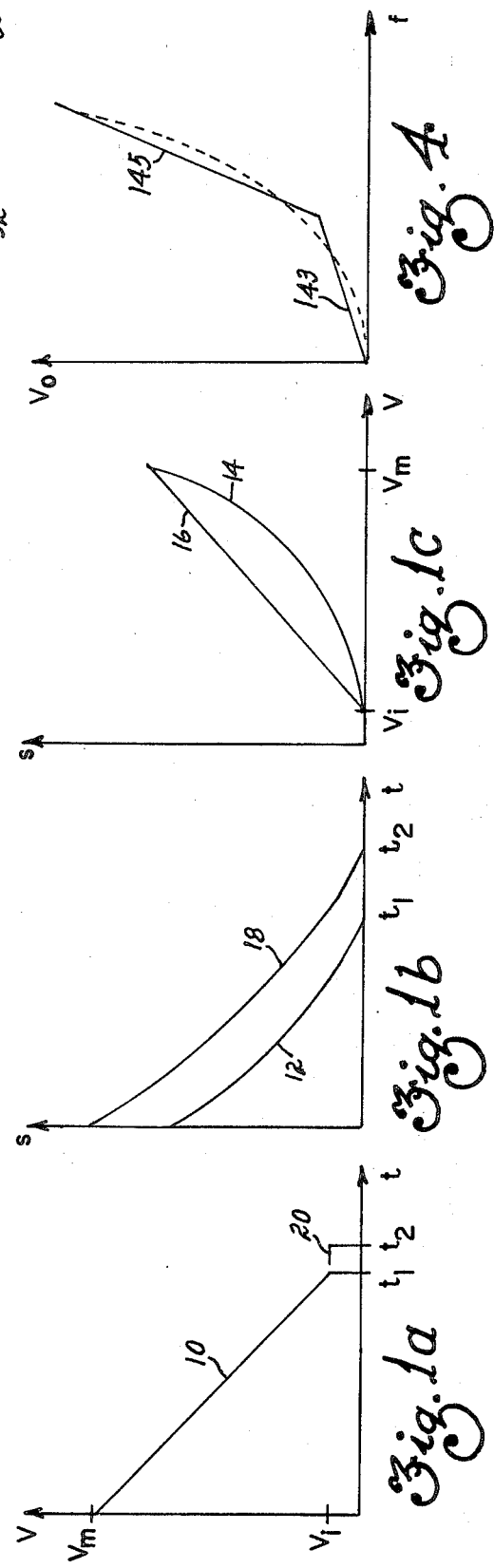

APPARATUS FOR COMMANDING A DECELERATION IN NUMERICAL CONTROL SYSTEMS

BACKGROUND OF THE INVENTION

This invention relates generally to the area of numerical control systems of the type in which a driving mechanism is responsive to command pulses supplied by a command circuit. The driving mechanism executes a fixed increment of displacement in response to each command pulse. The feed velocity and acceleration of the driving mechanism correspond respectively to the command pulse rate and the rate of change of the pulse rate. The driving mechanism may comprise a stepping motor, another type of electric motor or an electro-hydraulic unit. The present invention is not concerned with this mechanism but with the command circuit. Although the invention has particular utility in relation to the multi-axis numerical control of machine tools, it will be appreciated that the driving mechanism can be used to drive any required load and that the invention is applicable to single axis operation. Specifically, the invention provides a deceleration command circuit which initiates a deceleration span to move a load to an accurate final position in the minimum time.

In almost all numerically controlled systems, the values of acceleration and deceleration are constant. Further, these values are usually but not necessarily equal. Therefore, deceleration may be represented by a curve 10 in a velocity versus time diagram of FIG. 1a. The velocity of the system may not exceed a value $V_m$, and the deceleration must not exceed a value determined by the slope of the curve 10. The velocity $V_m$ may well be variable, e.g. under operator control or under program control. The velocity value $V_i$ represents a velocity magnitude from which deceleration can be affected substantially instantaneously or in a step function. The velocity and deceleration limitations are a function of system inertia, the need to avoid slip in electric motors, the maximum permitted tool speed for a machining operation and other similar considerations. The limiting values of these parameters may vary from system to system, but the shape of the curve is common to most systems.

By integrating the curve 10 of FIG. 1a, the curve 12 of FIG. 1b is obtained which illustrates how the distance in the deceleration span is traversed. The distance decreases as a function of the square of time until the end point is detected. However, the problem is how to determine when to start decelerating. From the dynamics equation $v^2 = 2a\,s$, a curve 14 in FIG. 1c can be plotted which represents the distance in the deceleration span versus velocity. For any given velocity between $V_i$ and $V_m$ the length of the deceleration span is a function of the square of the velocity. The systems known in the prior art ignore this relationship in determining the length of deceleration spans; and consequently, the prior art systems do not provide the most efficient positioning cycle.

Some prior art systems fix a certain slow down distance from the destination and start to decelerate when only this distance remains. The slow down distance is made large enough to leave sufficient time under the most adverse possible conditions. Although such a procedure is safe, it means that the latter part of most traverses is executed by a prolonged creeping which is time wasting and irritating to the operator. Short traverses will be executed wholly by creeping. Other systems provide several, e.g. three, different stopping distances corresponding to three different speed ranges. The stopping distance at any given instance being selected in correspondence with the prevailing speed. This reduces the amount of creeping but does not eliminate it. Still other systems assume a linear relationship between the distance and velocity. This is indicated by the curve 16 in FIG. 1c. Therefore, for any given velocity below $V_m$, curve 16 provides a substantially larger value of a deceleration span than the curve 14. Consequently, the curve 18 in FIG. 1b results from the longer length of the deceleration span. Curve 20 of FIG. 1a shows that after the deceleration is complete, the minimum velocity $V_i$ must be sustained for a substantial period of time before an end point is detected. This results in a longer time to execute the deceleration span as indicated by the difference between $t_2$ and $t_1$. This time difference when taken cumulatively over a plurality of positioning movements results in a substantial inefficiency.

Applicant's disclose an apparatus which for any given value of velocity provides a deceleration span which is defined by the curve 14 of FIG. 1c. Consequently, the deceleration span is initiated at a point which brings the system very close to the desired end point at the end of the deceleration span. Hence, a final position is realized in the minimum time.

SUMMARY OF THE INVENTION

Applicant proposes an apparatus for commanding deceleration of a driving mechanism coupled to a movable element. A numerical control provides a position signal defining the magnitude of the untraversed distance of the movable element along a predetermined path of motion. Within the control, an oscillator having a frequency control produces a plurality of oscillator pulses having a frequency representing the velocity of the movable element. The driving mechanism is responsive to the frequency of the oscillator pulses for driving the movable element at a velocity corresponding to said frequency. A squaring circuit having an input responsive to the oscillator pulses produces an output signal varying as a function of the square of the frequency of said pulses. The position signal is compared with the output signal from the squaring circuit, and a deceleration signal is produced when the magnitude of the difference between said signals reaches a predetermined value. The deceleration signal is input to the frequency control of the oscillator circuit for commanding a decrease in the frequency of the oscillator pulses at a predetermined rate.

BRIEF DESCRIPTION OF THE DRAWINGS

FIGS. 1a, 1b and 1c are graphical illustrations comparing applicant's invention with prior art.

FIG. 2 is a block diagram of the preferred embodiment of applicant's invention.

FIG. 4 is a graphical illustration of the output of the squaring circuit disclosed herein.

DESCRIPTION OF THE PREFERRED EMBODIMENT

Figure 3A:
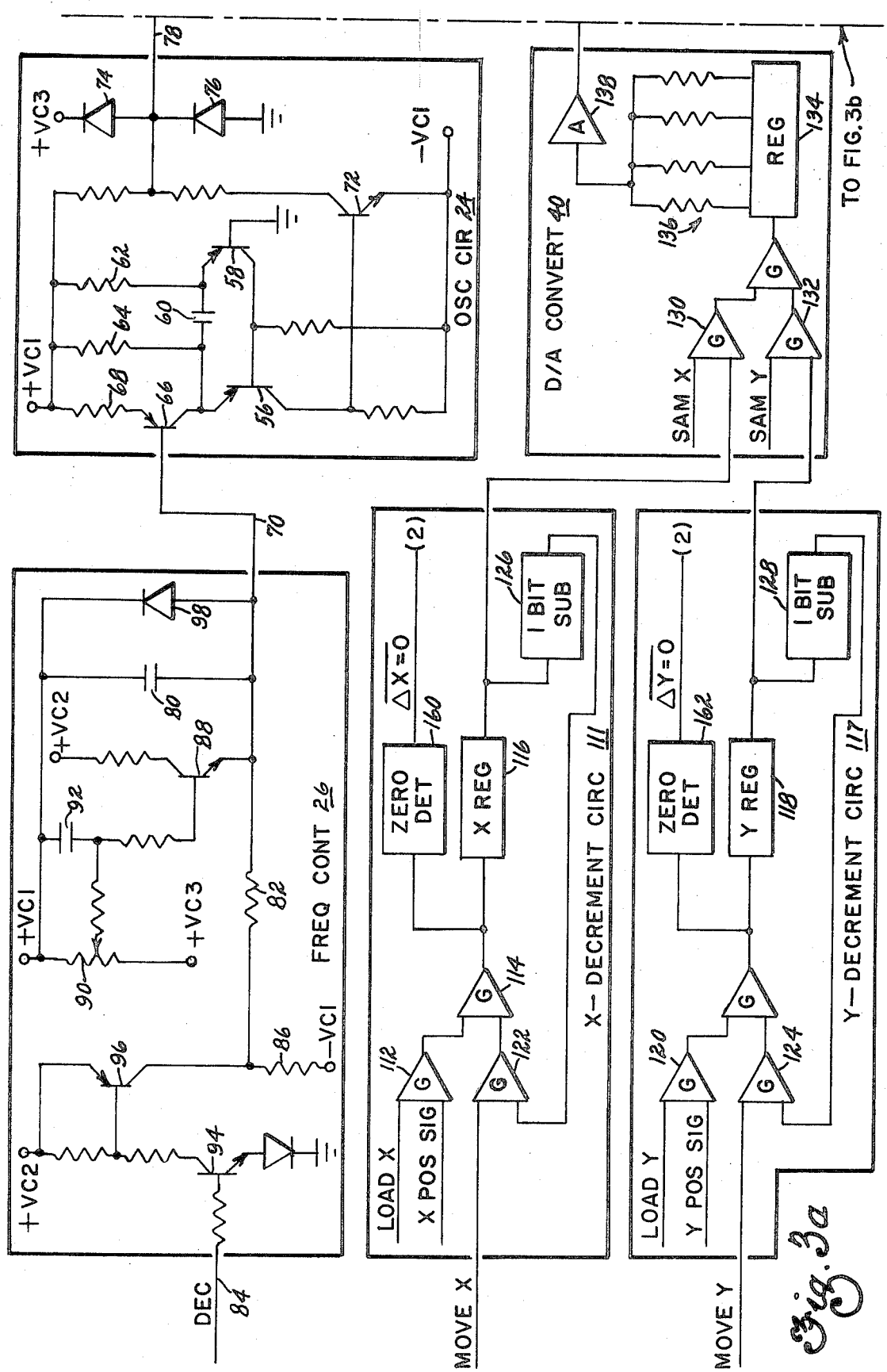
FIGS. 3a and 3b when joined along the indicated junction line, comprise a detailed schematic diagram of the preferred embodiment of applicant's invention.

FIG. 2 is a block diagram of the preferred embodiment of applicant's invention. The apparatus of applicant's invention operates within and forms a part of a numerical control 21. The remaining circuitry of the control 21 is not shown. Such circuitry provides signals for synchronizing the operation of applicant's invention in a manner well-known to those who are skilled in the art of control design. Typical in most controls, is an apparatus for supplying a plurality of pulses such as feed rate oscillator 22. Further, the rate oscillator typically is comprised of a basic oscillator circuit 24 and a means for changing the oscillator frequency such as the frequency control 26. Each pulse produced by the oscillator 22 represents a desired increment of motion of a movable element 30. Therefore, the movable element 30 is coupled to a driving mechanism 32 which is responsive via a gating network 33 to the pulses from the oscillator 22 to drive said element 30 along a predetermined path. Further, the frequency of the pulses from the oscillator represents the velocity of motion of the element. Consequently, an acceleration and deceleration is provided by changing the frequency of the oscillator circuit 24 with the frequency control 26. In a manner well-known in the art, a digital position signal is supplied on a line 34 representing a predetermined distance to be traveled by the movable element. In other words, the distance defined by the difference between a predetermined end point position and the present position of the movable element. The position signal is input to a decrementing circuit 36 having another input connected to the output of the oscillator 22. The circuit 36 decreases the magnitude of the distance represented by the position signal a predetermined amount in response to each pulse from the oscillator 22. This operation produces a new digital position signal on an output line 38 which is connected as an input to a digital to analogue converter 40. The converter 40 generates an analogue position signal representing the distance untraversed along the path to the end point. It should be noted that a decrementing circuit for producing a position signal as described above is a standard circuit configuration in many numerical controls. Further, for simplicity, the examples described herein will not consider that quantities may, in fact, be negative. The handling of the sign or direction of motion is well within the knowledge of those who are skilled in the art.

The output of the oscillator 22 is also connected to an input of a squaring circuit 42. The squaring circuit 42 produces an output signal having a magnitude which increases as a function of the square of the input. In other words, the output signal increases as a function of the square of the frequency of the pulses from the oscillator or as a function of the square of the velocity of the movable element. A comparator circuit 44 has inputs connected to the outputs of the squaring circuit 42 and the converter 40 and produces a control signal indicating that the difference between the analogue position signal and the square of the velocity is some predetermined magnitude, e.g. zero. A detection circuit 46 is connected to the circuit 44 and produces a deceleration signal in response to the control signal. The deceleration signal passes through a minimum frequency control 48 and is input to the frequency control 26 commanding a deceleration or decrease in the frequency of the oscillator pulses. Therefore, with any given velocity, deceleration is initiated at a distance from the end point consistent with the ideal distance-velocity relationship shown as curve 14 in FIG. 1c. To briefly summarize, a squaring circuit produces an output signal having a magnitude representing the square of the velocity of the movable element. In comparator and detection circuits, the output signal is compared with a position signal having a magnitude representing the untraversed distance of the movable element. When the difference between the two signals reaches a predetermined magnitude, e.g. zero, a deceleration signal is produced to the feedrate oscillator commanding a decrease in the velocity.

The oscillator output is connected to an input of a minimum frequency control 48. The control 48 limits the minimum value of the frequency of the oscillator pulses to a value representing a minimum velocity $V_t$. When the deceleration signal has decreased the frequency of the oscillator pulses to a value representing the minimum velocity, the control 48 terminates the deceleration signal output; and hence, the decrease in the frequency of the oscillator pulses is terminated. The oscillator pulses continue but at a minimum frequency, and the motion of the movable element continues but at a minimum velocity. A zero detector 52 is connected to the decrementing circuit 36 and produces an output signal in response to the digital position signal being decremented to zero. This output signal is input to the gating network 33 and is operative to terminate the output of the oscillator pulses therefrom. This stops the movable element exactly at the end point. However, since the length of the deceleration span has been accurately defined, the distance moved at the minimum velocity will always be very small and consume only an negligible amount of time.

Figure 3B:
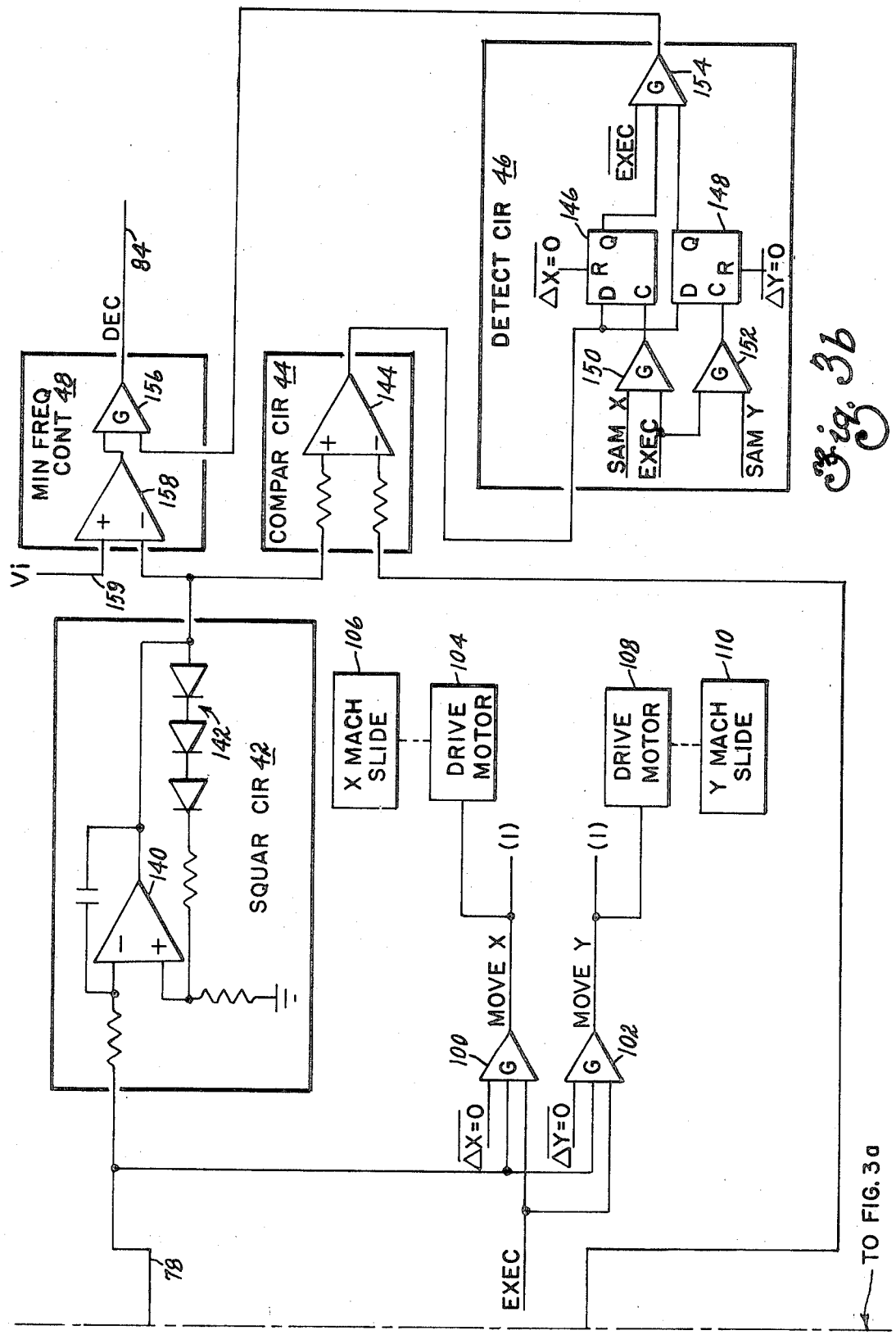

FIGS. 3a and 3b when joined along the indicated junction line comprise a detailed schematic diagram of the preferred embodiment. It should be noted that the elements of FIG. 3 operate as a part of a numerical control in a manner described earlier. Timing signals are generated by the control which synchronize the operation of these elements; and the generation of such signals is deemed to be well within the skills of those in the art.

In FIG. 3a, a frequency control 26 and oscillator circuit 24 comprise a feed rate oscillator. The oscillator circuit 24 contains emitter coupled transistors 56 and 58 with the ON time and OFF time of the output pulses determined by capacitor 60 and independently by the resistor 62 on the one hand and by the resistor 64, shunted by the transistor 66 and the resistor 68 on the other hand. The resistor 62 is fixed to give a fixed pulse width or ON time for the output pulses. As the conductance of the transistor 66 is varied by the control voltage on an input line 70, the OFF time or time duration between pulses is varied thus changing the oscillator frequency. The output of the oscillator is buffered by a transistor 72, clipped by diodes 74 and 76 and is then available on an output line 78. The control voltage is provided by a voltage across a capacitor 80, located in the frequency control 26, which in conjunction with a resistor 82 gives the required time constant for the acceleration and deceleration. In the absence of a deceleration signal on the input line 84, the capacitor 80 discharges through the series resistors 82 and 86. The former being greater than the latter. However, the discharge is caught at a potential representing the maximum velocity $V_m$ by the emitter base junction of a transistor 88. The potential representing the maximum velocity terminates the discharge at a point providing a reasonably linear frequency change and hence relatively constant acceleration value. In the example, the catching potential at the base of transistor 88 is derived from a manually adjustable potentiometer 90, but the potential might be derived from a program tape via a digital to analogue converter. A time constant comprised of capacitor 92 prevents the catching potential from changing too abruptly.

When a deceleration signal is applied on the input line 84, a transistor 94 is made to conduct causing another transistor 96 to conduct and charge the capacitor 80 in a reasonably linear manner. However, the control voltage is terminated at a value representing the predetermined minimum velocity $V_i$ by the minimum frequency control 48. Therefore, the more positive the control voltage the less the transistor 66 conducts and the lower the oscillator frequency. A catching diode 98 backs up this limitation on the positive excursion of the control voltage. The output pulses from the oscillator circuit 24 are input to logic gates 100 and 102 shown in FIG. 3b. An execute signal is also common to both the gates. The execute signal is generated within the numerical control at a time when the control is ready to command a motion. A move-X signal is generated by gate 100 and commands an increment of motion of the X-drive motor 104 for each oscillator pulse. The X-drive motor 104 is coupled to and drives the X-machine slide 106 in like increments. In a similar manner, the gate 102 commands the Y-drive motor 108 which is coupled to and drives the Y-machine slide 110.

Returning to FIG. 3a, prior to the occurrence of the execute signal, an X-position signal is passed through logic gates 112 and 114 in an X-decrement circuit 111 and is input to the register 116 on command from a load-X signal applied to the gate 112. Similarly, in a Y-decrement circuit 117, a Y-position signal is loaded into a resister 118 in response to a load-Y signal applied to gates 120. The load signals and the position signals are generated within the numerical control. A position signal represents the difference between a predetermined end point position and the present position of a machine slide. Upon the occurrence of the execute signal, move-X and move-Y signals are input to gates 122 and 124 respectively. These signals permit the position signals in the registers 116 and 118 to circulate through the one bit subtractors, 126 and 128 respectively, and return to the registers through the appropriate logic gates. Therefore, for each oscillator pulse, the machine slides move one increment; and the magnitudes of the position signals are decreased by one increment.

In response to sample-X and sample-Y signals alternately applied to logic gates 130 and 122 in the digital to analogue converter 40, the X and Y position signals from the registers 116 and 118 are alternately loaded into a register 134. Again, the sampling signals are provided at the appropriate times by the numerical control. Since deceleration is never required for larger distance values, it is not necessary to examine the most significant bits of the position signals. Further, since less accuracy is required in determining when to decelerate than is required in actual positioning, it is permissible to disregard the least significant bits. Therefore, in this embodiment, the position signals are 16 bit numbers but only the eighth through 12th bits from the least significant end are utilized in the circuit. Within the converter 40, which is of a standard configuration, the register 134 has parallel outputs connected to resistors indicated at 136. The resistors 136 are input to an operational amplifier 138 which produces an output analogue signal defining the magnitude of the sampled position signal.

In FIG. 3b, a squaring circuit 42 comprised of an integrating amplifier 140 is connected to the output 78 of the oscillator circuit 24. The integrating amplifier 140 has a positive feed-back loop established through three diodes indicated at 142. When the amplifier output exceeds the forward voltage drop of these diodes, the positive feed back loop acts to increase the rate at which the output increases with frequency. Therefore, the characteristics of the integrating amplifier are as shown in FIG. 4 in which the output is plotted against the frequency of the oscillator pulses. The characteristic consists of two linear segments 143 and 145 with the segment 145 having the greater slope. It will be seen that this characteristic closely approximates a square law shown in dashed lines. Experiments have shown that such an approximation gives very good results for any amplifier output value at which deceleration commences.

The output signal from the amplifier 140 is applied to an input of a differential amplifier 144 comprising the comparator circuit 44 and having a second input responsive to the analogue position signal from the converter 40. The output of the amplifier 144 is a control signal which indicates that the difference between the inputs is zero or some other threshold level at which deceleration may be commanded. The control signal is applied to two flip flops 146 and 148 located in the detector circuit 46. At times determined by the sampling signals which are applied to gates 150 and 152, the flip flops clock and store the signal present on their D inputs. If the control signal is present during a particular sampling time, it will be clocked in the appropriate flip flop and thus produced as a deceleration signal on the Q output. The deceleration signal passes through the gates 154 and 156 and is applied to the input 84 of the frequency control 26 thus commanding a deceleration or decrease in the frequency of the oscillator pulses.

Assume for purposes of illustration that the X-position signal represents a magnitude smaller than the Y-position signal. Upon the occurrence of the execute signal, both position signals will be continuously decremented and sampled on each oscillator pulse. When the X-position signal decreases to a magnitude which is equal to the square of the velocity, a control signal is output from the amplifier 144 and is stored in flip flop 146; hence, a deceleration signal is applied to the frequency control 26. A differential amplifier 158 located in the minimum frequency control 48 monitors the output of the squaring circuit 42. The amplifier 158 has a second input connected to a reference signal on line 159 representing the minimum velocity $V_t$. When the frequency of the oscillator decreases to this minimum value, the amplifier 158 produces an output signal to the gate 156 which terminates the application of the deceleration signal to the input 84 of the frequency control 26. The frequency control 26 then increases the oscillator frequency which is detected by the amplifier 158. Hence, the output from the amplifier 158 is terminated; and the deceleration signal is again applied to the input 84 of the frequency control 26. A state of dynamic equilibrium results with the oscillator frequency hunting about the minimum frequency defined by the reference signal on line 159. Thus the deceleration signal from the flip flop 146 causes the oscillator frequency to decrease, and the velocity of the X-machine slide to decrease to the minimum value $V_t$.

The velocity continues at this value until a zero detector 160 which monitors the X-position signal in register 116 produces an output indicating the X-position signal has a zero value. This output signal from the zero detector 160 is connected to the gate 100 and terminates the flow of oscillator pulses to the X-drive motor 104. In addition, the zero detector output is connected to the reset input of the flip flop 146 and is operative to terminate the deceleration signal. The frequency control 26 then increases the oscillator frequency to its maximum value. The Y-position signal continues to be decremented and sampled until it represents a magnitude equal to the square of the velocity. At this point, the amplifier 144 produces a control signal which is stored in flip flop 148; and another deceleration signal is applied to the frequency control 23. The frequency decreases to a minimum value and continues at that value until the zero detector 162 detects a zero value of Y-position signal. The output from the zero detector 162 is connected to the gate 102 for terminating the flow of oscillator pulses to the Y-drive motor 108 and is also connected to the reset input of the flip flop 148 for clearing the deceleration signal therefrom. Upon the numerical control terminating the execute signal, the not-execute signal is applied to the gate 154 generating another deceleration signal which holds the oscillator at the minimum frequency ready for the next movement.

It should be noted that for simplicity, the essentials of a two coordinate axis (X and Y) system are described. The extension to three or more coordinates is considered to be well-known to those who are skilled in the art. Further, in this embodiment, a single oscillator supplies the command pulses for both X and Y drive motors. As described above, for two coordinate traverses, the motor units will accelerate together and then decelerate together to complete whichever traverse is the shortest. Then only one unit will accelerate and decelerate again to complete the longer traverse. However, entirely separate systems could be provided for each axis including, if required, two voltage controlled oscillators.

While the invention has been illustrated in some detail according to the preferred embodiments shown in the accompanying drawings, and while the preferred illustrated embodiments have been described in some detail, there is no intention to thus limit the invention to such detail. On the contrary it is intended to cover all modifications, alterations and equivalents falling within the spirit and scope of the appended claims.

What is claimed is:

1. An apparatus for initiating a deceleration of a drive motor coupled to a machine slide, said apparatus being operative in a numerical control which provides a digital position signal representing the distance between an initial position of the machine slide and a predetermined final position, the apparatus comprising:
    a. a feed rate oscillator including:
        1. an oscillator circuit having an output in communication with the drive motor for generating a plurality of oscillator pulses, each of said pulses representing an increment of machine slide motion and the frequency of occurrence of said pulses representing velocity of the machine slide motion, and
        2. a frequency control circuit for selectively increasing and decreasing the frequency of occurrence of said pulses;
    b. an integrating amplifier having an input connected to the oscillator circuit and including a positive feed back loop for producing an amplifier output signal increasing approximately as a function of the square of the input;
    c. a decrementing circuit having one input connected to the oscillator circuit and another input responsive to the digital position signal for decreasing the magnitude of the distance represented by the position signal by a predetermined amount in response to each oscillator pulse to produce a new digital position signal;
    d. a digital to analogue converter connected to the decrementing circuit for producing an analogue position signal representing the magnitude of the distance defined by the new position signal;
    e. a comparator circuit having inputs connected to the integrating amplifier and the converter for subtracting the analogue position signal from the amplifier output signal and producing a control signal in response to a predetermined difference between the inputs; and
    f. a detection circuit having an input connected to the comparator circuit and an output connected to the frequency control for detecting the control signal and producing a deceleration signal to initiate a decrease in the frequency of occurrence of the oscillator pulses.

2. A positioning control comprised in part of a driving mechanism connected to a machine slide and commanded to drive said slide along a predetermined path of motion in response to a plurality of pulses from an oscillator circuit, said control producing a position signal continuously representing the magnitude of the untraversed distance of said predetermined motion, wherein the movement comprises:
    a. means responsive to the plurality of pulses for producing an output signal having a magnitude representing approximately the square of the magnitude of the frequency of the output pulses;
    b. means having inputs responsive to the position signal and the output signal for comparing the inputs and producing a deceleration signal in a response to a predetermined difference between said inputs; and c. means having an input responsive to the deceleration signal and an output connected to the oscillator circuit for causing in response to the deceleration signal the frequency of the plurality of pulses to decrease at an approximately constant rate to a predetermined minimum value.

3. A positioning control comprised in part of a driving mechanism connected to a machine slide and being commanded to drive said slide along a predetermined path of motion in response to a plurality of pulses from an oscillator circuit, the magnitude of said predetermined path of motion being represented by a position signal, wherein the improvement comprises:
   a. means responsive to each of the plurality of pulses and the position signal for incrementally reducing the magnitude represented by said position signal to produce a new position signal, said new position signal continuously representing the magnitude of the untraversed distance of the predetermined path;
   b. means responsive to the plurality of pulses for producing an output signal representing approximately the square of the frequency of the plurality of pulses;
   c. means having inputs responsive to the new position signal and the output signal for comparing the inputs and producing a deceleration signal in response to a predetermined difference between inputs; and
   d. means having an input responsive to the deceleration signal and an output connected to the oscillator circuit for causing in response to the deceleration signal the frequency of the plurality of pulses to decrease at an approximately constant rate to a predetermined minimum value.

4. A positioning control comprised in part of a driving mechanism connected to a machine slide and being commanded to drive said slide along a predetermined path of motion in response to a plurality of pulses from an oscillator circuit, the magnitude of the predetermined path of motion being represented by a position signal, wherein the improvement comprises:
   a. means having one input connected to the oscillator circuit and another input responsive to the position signal for modifying the position signal by a predetermined increment in response to each of the plurality of pulses to produce a new position signal;
   b. means responsive to the new position signal for producing an analogue position signal continuously representing the magnitude of the untraversed distance of the predetermined path;
   c. means having an input connected to the oscillator circuit for producing an output signal increasing approximately as a function of the square of the frequency of the plurality pulses;
   d. means having inputs responsive to the output signal and the analogue position signal for subtracting the analogue position signal from the output signal to produce a control signal in response to a predetermined difference between the inputs; and
   e. means responsive to the control signal and connected to the oscillator circuit for selectively increasing and decreasing the frequency of the oscillator circuit in response to said control signal.

* * * * *